(12) United States Patent
Doss

(10) Patent No.: US 11,610,198 B1
(45) Date of Patent: *Mar. 21, 2023

(54) SECURE TRANSACTIONS IN SOCIAL MEDIA CHANNELS

(71) Applicant: Wells Fargo Bank, N.A., San Francisco, CA (US)

(72) Inventor: Preethi Doss, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/989,345

(22) Filed: Aug. 10, 2020

Related U.S. Application Data

(63) Continuation of application No. 15/385,558, filed on Dec. 20, 2016, now Pat. No. 10,740,751.

(51) Int. Cl.
- *G06Q 40/00* (2012.01)
- *G06Q 20/36* (2012.01)
- *G06Q 50/00* (2012.01)
- *G06Q 20/40* (2012.01)

(52) U.S. Cl.
CPC ... *G06Q 20/3674* (2013.01); *G06Q 20/40145* (2013.01); *G06Q 50/01* (2013.01)

(58) Field of Classification Search
CPC ......... G06Q 20/3674; G06Q 20/40145; G06Q 50/01
See application file for complete search history.

(56) References Cited

U.S. PATENT DOCUMENTS

| 7,428,495 B2 | 9/2008 | Dhar et al. |
| 7,797,732 B2 | 9/2010 | Tam et al. |
| 7,885,901 B2 | 2/2011 | Hull et al. |

(Continued)

FOREIGN PATENT DOCUMENTS

| WO | 2012097171 A2 | 7/2012 |
| WO | 2013049359 A1 | 4/2013 |

(Continued)

OTHER PUBLICATIONS

Alireza Beikverdi et al, "Centralized payment system using social networks account," IEEE Fourth International Conference on Big Data and Cloud Computing, DOP 10.11098/BDCloud (2014) (Year: 2014).*

(Continued)

*Primary Examiner* — Abhishek Vyas
*Assistant Examiner* — William B. Bunker
(74) *Attorney, Agent, or Firm* — Shumaker & Sieffert, P.A.

(57) ABSTRACT

Techniques are described for authenticating a user to perform secure transactions with a secure system via social media channels. In one example, the secure system may comprise a financial institution with which the user has at least one financial account, and the transaction may comprise a transfer of funds initiated within a social media application executing on a user computing device. According to the techniques of this disclosure, the secure system authenticates the user to perform the transactions based on a combination of a device identifier (ID) associated with the user computing device, a biometric ID of the user of the user computing device, and a social media ID associated with a social media account held by the user.

14 Claims, 5 Drawing Sheets

(56) References Cited

U.S. PATENT DOCUMENTS

| | | |
|---|---|---|
| 7,974,889 B2 | 6/2011 | Raimbeault |
| 8,291,477 B2 | 10/2012 | Lunt |
| 8,347,370 B2 | 1/2013 | Headley |
| 8,571,580 B2 | 10/2013 | Altman et al. |
| 8,706,631 B2 | 4/2014 | Gupta |
| 9,147,117 B1 | 9/2015 | Madhu et al. |
| 9,432,351 B2 | 8/2016 | Lunt |
| 9,693,222 B1* | 6/2017 | Bradish ............... H04L 67/02 |
| 10,235,509 B2* | 3/2019 | Goldstein ............ G06F 16/636 |
| 10,740,751 B1 | 8/2020 | Doss |
| 2008/0133391 A1 | 6/2008 | Kurian et al. |
| 2010/0306099 A1 | 12/2010 | Hirson et al. |
| 2012/0041939 A1* | 2/2012 | Amsterdamski .... G06F 16/9535 707/E17.108 |
| 2012/0109804 A1 | 5/2012 | Gandhi et al. |
| 2012/0109830 A1 | 5/2012 | Vogel |
| 2012/0150553 A1 | 6/2012 | Wade |
| 2012/0158589 A1 | 6/2012 | Katzin et al. |
| 2012/0226579 A1 | 9/2012 | Ha et al. |
| 2013/0332337 A1 | 12/2013 | Tran |
| 2014/0006977 A1* | 1/2014 | Adams ............... H04L 12/1818 715/753 |
| 2014/0165178 A1 | 6/2014 | Perrone, II |
| 2014/0196110 A1 | 7/2014 | Rubinstein et al. |
| 2014/0279516 A1 | 9/2014 | Rellas et al. |
| 2014/0282870 A1 | 9/2014 | Markwordt et al. |
| 2014/0289815 A1* | 9/2014 | Lunt ................ G06F 16/24575 726/4 |
| 2015/0058016 A1 | 2/2015 | Goldstein |
| 2015/0371015 A1 | 12/2015 | Garcia Manchado |
| 2016/0110529 A1* | 4/2016 | Mathew ............. H04L 63/0884 726/7 |
| 2016/0148200 A1 | 5/2016 | Pureetip et al. |
| 2016/0241402 A1 | 8/2016 | Gordon et al. |
| 2016/0246869 A1 | 8/2016 | Gadamsetty |
| 2017/0039652 A1 | 2/2017 | Sandre et al. |
| 2017/0161745 A1 | 6/2017 | Hawkins |
| 2017/0171195 A1* | 6/2017 | Chang .................... G06F 21/32 |
| 2018/0068111 A1* | 3/2018 | Chen ....................... G06F 21/45 |
| 2018/0107992 A1* | 4/2018 | Al-Bedaiwi .......... G06Q 20/20 |
| 2018/0247033 A1 | 8/2018 | Mathew |
| 2019/0014142 A1 | 1/2019 | Madhu et al. |
| 2019/0325448 A1 | 10/2019 | Barakat et al. |
| 2020/0043023 A1 | 2/2020 | Korosec et al. |

FOREIGN PATENT DOCUMENTS

| | | | | |
|---|---|---|---|---|
| WO | WO-2013049359 A1 * | 4/2013 | .......... | G06Q 20/027 |
| WO | WO-2013130735 A1 * | 9/2013 | .......... | G06Q 20/387 |
| WO | 2015028916 A1 | 3/2015 | | |

OTHER PUBLICATIONS

Kokalitcheva, "Your Facebook friends could be the ticket to your next loan," retreived from http://fortune.com/2015/08/04/facebook-loan-approval-network/#, Aug. 4, 2015, 2 pages.

Quittner, "Banks to Use Social Media Data for Loans and Pricing," retrived from http://www.americanbanker.com/issues/177_18/movenbank-social-media-lending-decisions-brett-king-1046083-1.html, Jan. 26, 2012, 4 pages.

Alireza Beikverdi et al., "Centralized payment system using social networks account," IEEE Fourth International Conference on Big Data and Cloud Computing, DOI 10.11 09/BDCioud (Year: 2014), Dec. 3-5, 2014, 7 pp.

Prosecution History from U.S. Appl. No. 15/385,558, dated Dec. 20, 2016 through Jun. 30, 2020, 141 pp.

\* cited by examiner

SECURE TRANSACTIONS IN SOCIAL MEDIA CHANNELS

CROSS REFERENCE

This application is a continuation application of and claims priority to U.S. patent application Ser. No. 15/385,558 filed on Dec. 20, 2016, which is hereby incorporated by reference herein in its entirety.

TECHNICAL FIELD

The disclosure relates to secure transactions on computing devices.

BACKGROUND

Social media applications may allow users to transfer money from one account to another. In one example, a user may wish to transfer funds to another user, such as to a friend to help pay for a meal. These social media applications may include applications executed on a user computing device, such as a smart phone, a smart pad, a smart watch, a desktop or laptop computer, a smart television or another Internet of Things (IOTs) device, or the like. Some social media applications with the capability to transfer money require several back and forth messages to authenticate the transaction. For example, the sending user may initiate a transaction to transfer funds to a receiving user, and the receiving user may be required to acknowledge the transaction by enter a code or a password for the funds transfer to occur.

SUMMARY

In general, the disclosure is directed toward authenticating a user to perform secure transactions with a secure system via social media channels. In one example, the secure system may comprise a financial institution with which the user has at least one financial account, and the transaction may comprise a transfer of funds initiated within a social media application executing on a user computing device. According to the techniques of this disclosure, the secure system authenticates the user to perform the transactions based on a combination of a device identifier (ID) associated with the user computing device, a biometric ID of the user of the user computing device, and a social media ID associated with a social media account held by the user.

In some examples, this disclosure describes operations performed by a computing system in accordance with one or more aspects of this disclosure. In one specific example, this disclosure describes a method comprising maintaining, by a computing system, information about one or more stored device identifiers associated with a user, one or more stored biometric identifiers associated with the user, and a stored social media identifier associated with the user; receiving, by the computing system and from a social media application executing on a user computing device, a request to perform a financial transaction, wherein the request includes a device identifier associated with the user computing device, biometric information captured by the user computing device, and a social media identifier associated with the social media application; determining, by the computing system, that the social media identifier associated with the social media application does not match the stored social media identifier; identifying, by the computing system, an alternative social media identifier by accessing a social media graph associated with the user; and authenticating, by the computing system, the user based on a mapping of the device identifier to the one or more stored device identifiers, the biometric information to the one or more stored biometric identifiers, and the social media identifier to the alternative social media identifier. In another example, this disclosure describes a system including processing circuitry configured to perform operations described herein. In yet another example, this disclosure describes a non-transitory computer-readable storage medium comprises instructions that, when executed, configure processing circuitry of a computing system to perform operations described herein.

In another example, the disclosure is directed to a method for authenticating a user, the method comprising: receiving, by a secure system and from a user computing device, a request to perform a transaction with the secure system, the request including a device identifier (ID) associated with the user computing device, a biometric ID of a user of the user computing device, and a social media ID associated with a social media account held by the user. Comparing, by the secure system, a combination of the device ID, the biometric ID, and the social media ID to one or more ID patterns stored in a data structure, such as a table, at the secure system, and based on the combination of the device ID, the biometric ID, and the social media ID matching one of the one or more ID patterns, authenticating the user to perform the transaction.

In another example, this disclosure is directed to a method of accessing a secure system, the method comprising: executing, by a user computing device, a social media application with which a user of the user computing device has a social media account, receiving, by the user computing device, user input requesting a transaction with a secure system. In response to the user input requesting the transaction: retrieving a device identifier (ID) associated with the user computing device, retrieving, from the social media application executing on the user computing device, a social media ID associated with the social media account held by the user, and receiving, by the user computing device and from a biometric reader, a biometric ID of the user, and sending, by the user computing device and to the secure system, a request to perform the transaction with the secure system. The request may include the device ID, the social media ID, and the biometric ID of the user, and receiving a notification indicating whether the requested transaction is authenticated.

In a further example, this disclosure is directed to a user computing device for accessing a secure system, the user computing device comprising: at least one biometric reader configured to collect a biometric identifier (ID) of a user of the user computing device, and one or more processors in communication with the biometric reader and configured to: execute a social media application with which the user has a social media account, and receive user input requesting a transaction with the secure system. In response to the user input requesting the transaction, retrieve a device identifier (ID) associated with the user computing device, retrieve a social media ID associated with the social media account held by the user from the social media application, and receive the biometric ID of the user from the biometric reader, send to the secure system, a request to perform the transaction with the secure system, the request including a combination of the device ID, the biometric ID, and the social media ID, and receive a notification indicating whether the requested transaction is authenticated.

In an additional example, this disclosure is directed to a secure system computing device for authenticating a user to a secure system, the computing device comprising: a memory configured to store a table, or similar data structure, of one or more identification (ID) patterns; and one or more processors in communication with the memory and configured to: receive, from a user computing device, a request to perform a transaction with the secure system, the request including a device identifier (ID) associated with the user computing device, a biometric ID associated with the user of the user computing device, and a social media ID associated with a social media account held by the user, compare a combination of the device ID, the biometric ID, and the social media ID to the one or more ID patterns stored in the data structure in the memory. Based on the combination of the device ID, the biometric ID, and the social media ID matching one of the one or more ID patterns, authenticating the user to perform the transaction.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
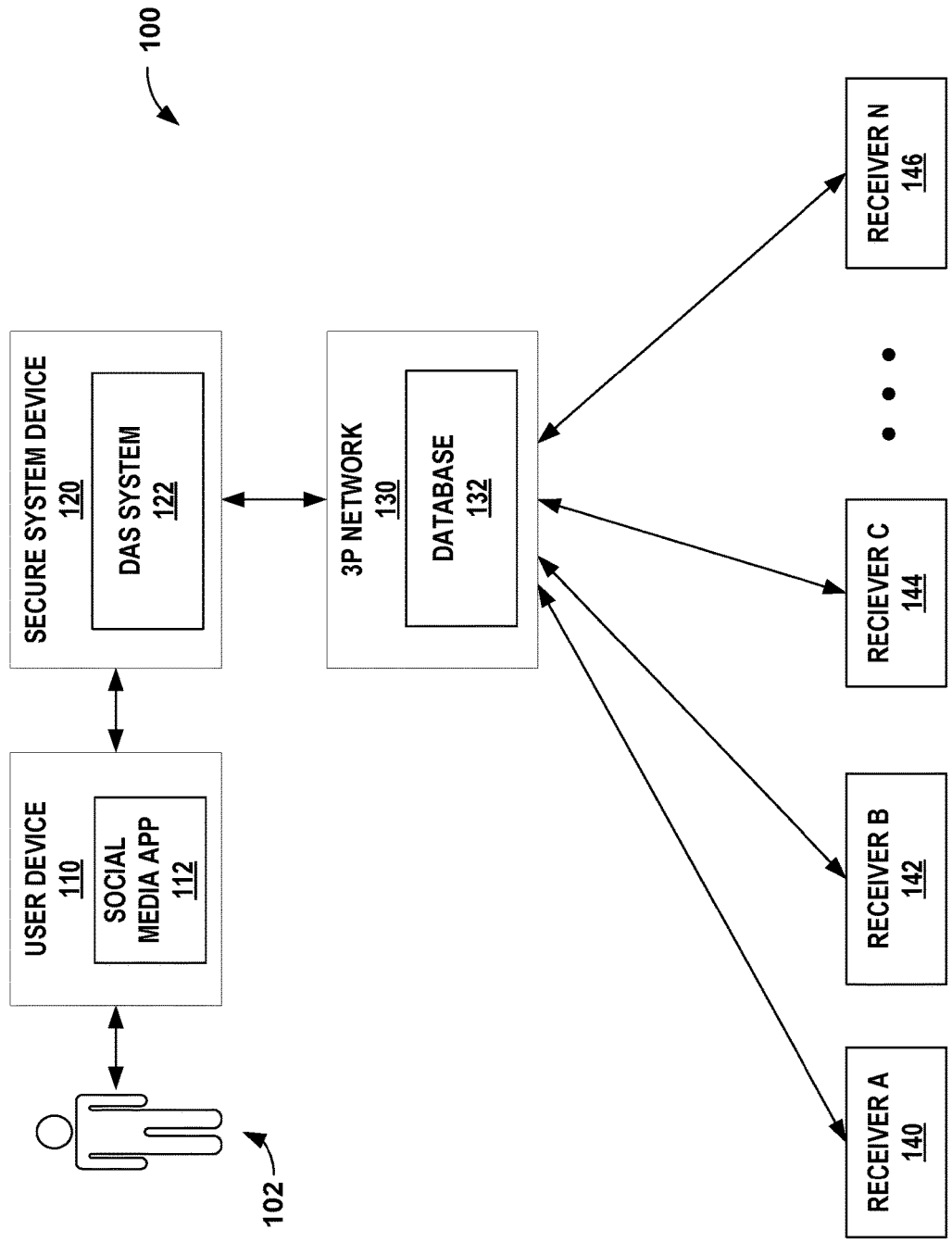
FIG. 1 is a block diagram illustrating an example secure authentication system including a secure system computing device configured to authenticate a user to perform a secure transaction through social media channels, in accordance with one or more techniques of this disclosure.

This disclosure is directed toward authenticating secure transactions with a secure system via social media channels. Secure transactions with a secure system may include accessing restricted information from a secure database, transferring funds from a bank account at a financial institution to a receiver, providing an electronic signature for a document, e.g., a loan application, with a financial institution, or other transactions where authenticating a user is desirable. For ease of description, the techniques of this disclosure are primarily described with respect to an example operation of performing a secure transfer of funds with a financial institution, such as a bank. The techniques of this disclosure, however, should not be limited to this example.

According to the disclosed techniques, a user that wishes to perform a secure transaction with a secure system from within their social media application may pre-register with the secure system, such as a financial institution, to enable such social media transactions. As part of the pre-registration process, the user may provide identification (ID) information to be stored either at the secure system or with a third-party. The ID information may include user device IDs, user biometrics information such as a fingerprint, voice recognition, and/or a retinal scan, and user social media account IDs.

Once pre-registered, the user may perform secure transactions with the secure system, e.g., transferring funds from an account held at the financial institution, that uses a three-part authentication scheme from within a social media application executing on the user's registered device. According to the three-part authentication scheme, the secure system authenticates the user to perform the secure transactions based on a match between a combination of a device ID, a biometric ID, and a social media ID provided by the user's computing device and one or more ID patterns stored at the secure system.

In some examples, a user's computing device may be lost or stolen. A nefarious user may attempt to access the social media applications executing on the mobile device and use the social media applications to access the authorized user's bank accounts, e.g., to transfer funds to an account associated with the nefarious user. Authenticating transactions according to the three-part authentication scheme described in this disclosure may prevent such unauthorized transactions.

The three-part authentication scheme, according to this disclosure, may provide several additional advantages beyond being a secure way to authenticate a user and the user's requested transaction, including being simple for the user and reducing an amount of network traffic between a user computing device and the secure system for authentication. In the example of transferring funds, a user need only provide a receiver of the funds, an amount of the funds, and a fingerprint or other biometrics information. An application programming interface (API) of the social media application executing on the user's computing device may collect the device ID and the social media account ID in the background, and send the information to the secure system to complete the three-part authentication.

In an example where the secure system comprises a bank and the secure transaction comprises a transfer of funds from a sender's account at the bank, the sender may make the fund transfer request via a social media application executed on the sender's computing device. In this example, the API of the social media application may retrieve a device ID associated with the sender's computing device, retrieve a social media ID associated with the social media account of the sender, and prompt the sender to enter a biometric ID, e.g., a fingerprint. The bank's API may interact with the social media application's API to receive the three IDs from the sender. According to the techniques of this disclosure, a device and social media (DAS) system at the bank compares the combination of the three IDs for the sender to one or more ID patterns stored in a DAS table at the bank, and, upon finding a match, authenticates the sender to perform the requested funds transfer from the sender's account.

In some examples, the bank may include a third party (3P) digital payment network to transfer funds between a sender and a receiver. When using a 3P digital payment network both the sender and the receiver may pre-register with the 3P digital payment network. In more general terms a "3P digital payment network" may also be referred to as a 3P network in this disclosure. The sender and receiver may each provide identification information such as email address, phone number, device IDs for computing devices associated with the user, user biometric information of the user, a social media graph that identifies social media accounts held by the user, bank account information, and similar information to the 3P digital payment network as part of the pre-registration process. In some examples the sender's bank or the receiver's bank, or both, may be a participating member of the 3P digital payment network.

When the sender makes a first request to transfer funds from the sender's account at the bank via a social media application executed on the sender's computing device, the DAS system at the bank may interact with the 3P network to authenticate the sender. The DAS system may retrieve identification information for the sender from the 3P network that may include device IDs, a social media graph, and biometrics information of the user. In one example, the DAS system may send biometric information of the user received with the fund transfer request to the 3P network to identify the sender. In response, the 3P network may provide the device IDs, social media graph, and biometrics associated with the sender. The DAS system at the bank may use this information to authenticate the sender is a valid user. The DAS system may then generate a personal ID pattern for the combination of device ID, biometrics ID, and social media ID received from the sender's computing device, and store the personal ID pattern in a DAS table for authentication of subsequent transactions. In some examples the personal ID pattern will be unique for the combination of device ID, biometrics ID, and social media ID.

FIG. 1 is a block diagram illustrating an example secure authentication system 100 including a computing device configured to authenticate a user 102 to perform a secure transaction through social media channels, in accordance with one or more techniques of this disclosure. Secure authentication system 100 may use techniques described in this disclosure to authenticate a user of a computing device for a variety of purposes, such as transferring funds, accessing restricted or private information, signing a document, or other purposes where authenticating a user prior to providing access to a secure system may be desirable.

In the example of FIG. 1, secure authentication system 100 uses a three-part authentication scheme to authenticate a user 102. The three parts may include a device ID, a social media account ID, and a biometric identification (referred to as a "bio ID" or "biometric ID") of the user, such as a fingerprint, voice identification, or retinal scan. A device and social media (DAS) system 122 at secure system device 120 may create a personal identifier for unique combinations of device ID, biometrics ID, and social media account ID. Secure system device 120 may use this personal identifier to authenticate a user to perform a transaction. In some examples, the personal identifier may be called an ID pattern or a DAS ID.

Secure authentication system 100 includes a user computing device 110 that may communicate with a secure system device 120 to request a transaction with a secure system to which secure system device 120 belongs. For example, secure system device 120 may comprise a computing device within a financial institution and the requested transaction may comprise a transfer of funds for an account held at the financial institution. In the illustrated example, secure authentication system 100 includes a third-party (3P) network 130 that is in communication with one or more receivers, e.g., receiver A 140, receiver B 142, receiver C 144, and receiver N 146, as recipients of the secure transaction. In the scenario of a fund transfer transaction, one or more of receivers 140-146 may be banks, non-bank financial institutions, other user computing devices, or a merchant point of sale (POS) devices. In other examples, secure system device 120 may communicate directly with receivers 140-146 without the use of 3P network 130.

User 102 may be anyone who interacts with device 110. Though secure authentication system 100 may be useful for any purpose for which a positive identification of the user is desirable, this disclosure will focus on the example of sending money to simplify the explanation of the techniques of this disclosure. In this disclosure, the terms "transfer funds," "send money," "money transfer" and similar terms are used interchangeably. In the example of a fund transfer, the user 102 may be considered the sender of money. The user 102 interacts with a user interface on device 110 to input information to social media application 112. The user 102 may be an individual sending funds or a representative of a business or organization that may send funds. For example, an automobile insurance company may transfer funds from the insurance company bank account to a claimant's account to pay for damage to the claimant's car.

Device 110 may be any mobile or non-mobile computing device with a sensor to collect a bio ID. Such a sensor may include a camera to collect a retinal scan or facial recognition image, a fingerprint scanner, a microphone to collect a voice ID, or some similar sensor. Device 110 may be a mobile device such as a smart phone, a smart watch, a smart pad, a tablet computer or a similar device. The user's device may also be non-mobile, such as a laptop or desktop computer, a smart TV, or another Internet of Things (IOT) device. Device 110 may include one or more processors that execute programming instructions. For example, device 110 may execute one or more social media applications 112 or other applications such as other payment applications that may be used to send money from a sender to a receiver. Social media application 112 executing on device 110 may instruct secure system device 120 to transfer a selected amount of money to a receiver.

Secure system device 120, in the example of FIG. 1 may be included within a secure system, e.g., the sender's bank or other financial institution. Secure system device 120 may be part of a centralized or distributed secure system of one or more computing devices, such as such as desktop computers, laptops, workstations, wireless devices, network-ready appliances, file servers, print servers, or other devices. The user 102 may have one or more accounts at the bank, such as checking, savings, money market, or similar accounts. DAS system 122 of secure system device 120 may retain a plurality of ID patterns, or identifiers, made up of the combination of device ID, social media ID and bio ID. In some examples, additional information may be associated and stored with the ID pattern, such as the social media graph of the user. The social media graph will be discussed in more detail below with respect to FIG. 3. When secure system device 120 receives instructions from the user 102 via device 110 to transfer money, secure system device 120 may authenticate the user using the three-part authentication scheme discussed above, and in more detail below. If the combination of device ID, social media ID and biometric ID match the ID pattern associated with an account belonging to the user, secure system device 120 may authorize the money transfer to the receiver specified by the user.

In some examples, secure system device 120 may transfer money directly to the account of a receiver, e.g., one of receivers 140-146, specified by the user. In other examples, secure system device 120 may interact with 3P network 130 to transfer the funds to the specified receiver. 3P network 130 may be in communication with a plurality of other bank or non-bank financial institutions, user computing devices, or POS devices. In the example of FIG. 1, 3P network 130 is in communication with receiver A 140, receiver B 142, receiver C 144, and receiver N 146.

In examples where a receiver is not a bank or other financial institution, the receiver may pre-register with 3P network 130 through a bank or may pre-register directly with 3P network 130 instead of through a bank. For example, receiver C 144 may be another user computing device, and may receive money from any sender, including the user 102, and store the funds at 3P network 130. Receiver C 144 may also send funds to another receiver account by directly communicating with 3P network 130.

In one example, the user 102 pre-registers a social media application 112 executed on device 110 with secure system device 120. While in communication with device 110 during pre-registration, secure system device 120 may prompt social media application 112 to collect a bio ID. For example, secure system device 120 may prompt social media application 112, such as Facebook or WhatsApp, to collect a fingerprint impression using a biometric reader on device 110. In other examples, social media application 112 may automatically output a prompt to the user to enter a biometric ID when performing a secure transaction. In response to the pre-registration, secure system device 120 may create a personal identifier, or ID pattern, that includes the device ID of user device 110, the social media ID for the user's account on social media application 112, and the collected bio ID. The user 102 may specify one or more user accounts at the financial institution to associate with the ID pattern. Once registered, the user 102 may use the registered social media application 112 on the registered device 110 to send money to a receiver. Secure system device 120 may compare the three-part authentication information received with requested money transfer from social media application 112 to authenticate user 102.

In another example, the user 102 pre-registers the user's identification information with either secure system device 120 or 3P network 130. For example, user 102 may provide 3P network 130 with one or more device IDs associated with user device 110 and other user devices owned by the user, one or more biometric IDs of the user, such as fingerprints, voice recognition samples, and/or retinal scans, and a social media graph identifying one or more social media accounts held by the user. 3P network 130 may then store the identification information for the user in database 132.

Once registered, the user 102 may make money transfers that use the three-part authentication scheme from within social media application 112 on registered user device 110. For example, the user 102 may interact with social media application 112 executing on device 110 to send money to a receiver with an account at receiver A 140. The user 102 enters the receiver's identification, the amount to be transferred and a bio ID.

Upon receipt of the money transfer request from user device 110, DAS system 122 of secure system device 120 compares the combination of the received device ID of device 110, social media ID from social media application 112 and the bio ID to one or more ID patterns stored in a data structure, such as a table at DAS system 122. If all the received information matches one of the personal ID patterns stored in the table at DAS system 122, secure system device 120 may authorize 3P network 130 to transfer funds from the account at secure system device 120 belonging to the user to the specified receiver's account at receiver A 140.

If any of the received information does not match, i.e., the combination of device ID, social media ID, and bio ID is used for the first time, secure system device 120 may communicate with 3P network 130 to attempt to authenticate the user. For example, DAS system 122 may retrieve the identification information for the user from database 132, and authenticate the user based on mapping the received device ID, social media ID, and bio ID for the user to the identification information for the user. If a mapping is found, DAS system 122 may generate a personal ID pattern for the combination of the device ID, social media ID, and bio ID received from user device 110, and store the personal ID pattern in the data structure at DAS system 122 for authentication of subsequent transactions using the same three IDs. If a mapping cannot be found with the identification information within database 132, DAS system 122 may deny the requested fund transfer.

In other words, the user may explicitly pre-register with secure system device 120 for DAS system 122 to create a DAS ID pattern for subsequent transactions. Alternatively, in examples where information about user 102 exists at 3P network 130, DAS system 122, within secure system device 120, may retrieve the identification information for the user from database 132, and authenticate the user. Information about user 102 may exist at 3P network 130 under a variety of circumstances. In some examples, user 102 may be a user of another secure system, different than secure system device 120, where that secure system also interacts with 3P network 130. In other examples, user 102 may directly pre-register with 3P network 130. Therefore, with the pre-registered information of the user 102 at 3P network 130, DAS system 122 may create an ID pattern for the first time user without the first time user explicitly pre-registering at secure system device 120.

In this manner, the three-part authentication scheme provides secure techniques to prevent a nefarious user who finds or steals a user computing device from having access to the funds belonging to the valid user by denying a fund transfer when any one of device ID, biometric ID or social media ID fails to match one of the ID patterns. The three-part authentication scheme may also have advantages over other authentication schemes in that three-part authentication is simple for the user. In contrast to an example person-to-person (P2P) fund transfer technique, the three-part authentication scheme according to this disclosure does not require the user to both download a specific application that will access all the social media applications and other payment applications on the user's computing device as well as require the user to open a separate account at the bank that supports the specific application. Instead, the three-part authentication technique may use a social media application or payment application that the user already uses, such as social media application 112, to access an account that the user already owns at a bank that the user already trusts. Therefore, the three-part authentication scheme of this disclosure may be both secure as well as simple for the user.

The social media ID that is part of the three-part authentication scheme of this disclosure may not be the actual username, password, personal identification number (PIN) or other login information used by the payment application or other social media application. Instead, to protect the actual login credential information of the user, the social media application 112 may provide secure system device 120 with an access token for the social media application executing on device 110. An access token may contain the security credentials for a login session and identifies the user, the user's groups, the user's privileges, and, in some cases, a particular application, but without revealing, for example, the username and PIN for the user. Secure system device 120 may use other techniques similar to access tokens to retrieve social media ID from a social media application, while protecting the particular login information of the user. In some examples, access tokens for social media accounts held by user 102 may be stored in database 132 of 3P network 130 along with the user's other pre-registered identification information.

In some examples, while pre-registering, secure system device 120 may pull information from 3P network 130, such as the social graph of user 102, which may be represented in access tokens. User 102 may select the appropriate social media ID for which the user intends to pre-register with user device 110. DAS system 122 may create a personal ID pattern using the social media ID that user 102 selected, along with the device ID and biometric ID of user 102.

The three-part authentication scheme according to this disclosure may provide several advantages. The three-part authentication scheme is secure because, in an example in which the user loses device 110 or if device 110 is stolen, the techniques of this disclosure protect the user from the actions of a false user. A false user, attempting to transfer funds with a social media application 112 executing on device 110 may be able to send the device ID and the social media ID to secure system device 120. However, the false user would not be able to provide the biometric ID. Therefore, when secure system device 120 compares the three pieces of identification information received from device 110 with the stored ID patterns, the three IDs would fail to match any of the personal ID patterns. Secure system device 120 may then deny the requested fund transfer. In some examples, secure system device 120 may also lock or disable fund transfers requested by the user device 110 identified by the compromised device ID and/or fund transfers requested by social media application 112 identified by the compromised social media ID. According to the disclosed techniques, however, the valid user may still be able to access the user's bank account via another user device and/or another social media account held by the user.

The three-part authentication scheme may have additional technical advantages over other authentication schemes. Some examples include reduced bandwidth and data usage as fewer communication messages need be sent, when compared to a system that sends emails or other notifications to both receiver and sender asking each to confirm the transaction. The three-part authentication may be more secure than the back and forth confirmation schemes because it may be more difficult to imitate either the sender or receiver. Fewer interactions may also reduce errors, and rejected transactions, such authentication systems that require detailed transaction information, such as account number, bank routing number, access permission and similar information. Fewer interactions may also reduce the likelihood that some information may be intercepted and used to gain unauthorized access to a secure system.

The three-part authentication scheme is simple for the sender because the device ID, social media ID, and authentication process continues without requiring the sender's involvement. In the example of FIG. 1, the user need only identify the receiver, list the amount of money to be transferred, and provide the biometric ID when prompted. The user device 110 communicates with secure system device 120 to provide the additional information to verify the identity of the user.

When compared to other payment systems, the techniques of this disclosure may have additional advantages. For example, the user may transfer funds using a bank account at the bank that the user may already trust. The user may not need to have with a third-party account, or to open an account with the bank that hosts another type of payment system. To send money, the user need only identify the receiver, such as with the receiver's phone number, email address or similar identification. The user may not need to request the receiver's private payment information, such a bank routing number and account number. The techniques of this disclosure may also avoid several back and forth message exchanges between sender and receiver, such as may be found in some conventional payment systems. For example, in some payment systems, the sender device may identify the receiver device and the amount, then the receiver may get a message notifying the receiver of the pending fund transfer. The receiver may need to send a message to the sender confirming the notification, e.g., by entering a code or password, before the sender can complete the fund transfer. This may delay the fund transfer process and add additional complication.

Figure 2:
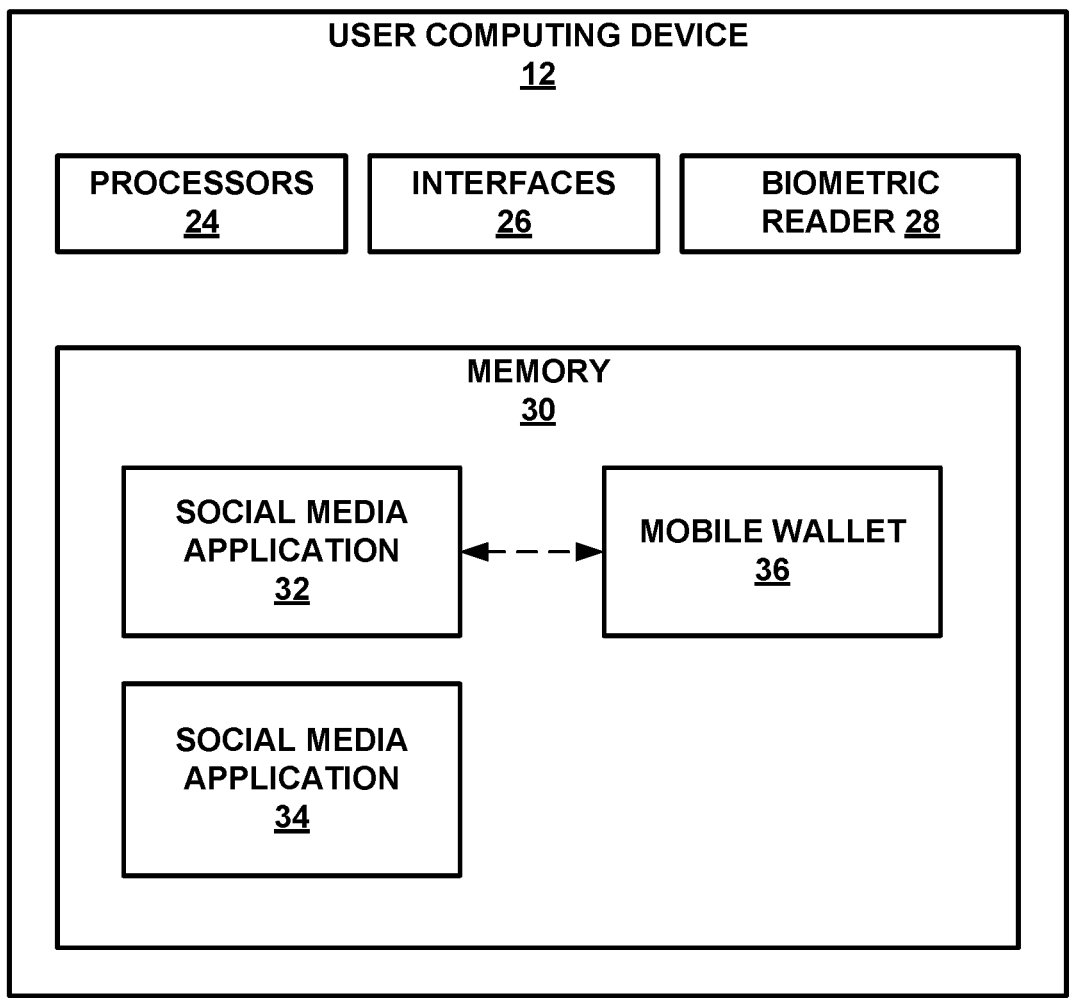
FIG. 2 is a block diagram illustrating an example of a user computing device including one or more social media applications and a virtual wallet unit, in accordance with the techniques of this disclosure.

FIG. 2 is a block diagram illustrating an example of a user computing device 12 including at least one social media application 32, 34 configured to communicate with a secure system, in accordance with the techniques of this disclosure. User computing device 12 may operate substantially similar as user device 110 from FIG. 1. The architecture of user computing device 12 illustrated in FIG. 2 is shown for exemplary purposes only and user computing device 12 should not be limited to this architecture. In other examples, user computing device 12 may be configured in a variety of ways.

As shown in the example of FIG. 2, computing device 12 includes one or more processors 24, one or more interfaces 26, and one or more biometric reader units 28. Computing device 12 also includes mobile wallet application 36 and one or more social media applications 32 and 34, which may be implemented as program instructions and/or data stored in memory 30 and executable by processors 24 or implemented as one or more hardware units or devices of computing device 12. Memory 30 of computing device 12 may also store an operating system and a user interface unit executable by processors 24. The operating system stored in memory 30 may control the operation of components of computing device 12. Although not shown in FIG. 2, the components, units or modules of computing device 12 are coupled (physically, communicatively, and/or operatively) using communication channels for inter-component communications. In some examples, the communication channels may include a system bus, a network connection, an inter-process communication data structure, or any other method for communicating data.

Processors 24, in one example, may comprise one or more processors that are configured to implement functionality and/or process instructions for execution within computing device 12. For example, processors 24 may be capable of processing instructions stored memory 30. Processors 24 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 30 may be configured to store information within computing device 12 during operation. Memory 30 may include a computer-readable storage medium or computer-readable storage device. In some examples, Memory 30 include one or more of a short-term memory or a long-term memory. Memory 30 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 30 are used to store program instructions for execution by processors 24. Memory 30 may be used by software or applications running on computing device 12 (e.g., social media application 32, social media application 34, and mobile wallet 36) to temporarily store information during program execution.

Computing device 12 may utilize interfaces 26 to communicate with external devices via one or more networks or via wired or wireless connection to another device. Interfaces 26 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 12 utilizes interfaces 26 to wirelessly communicate with an external device such as secure system device 120 or 3P network 130 depicted in FIG. 1.

Computing device 12 may also utilize interfaces 26 to communicate with users of computing device 12. Interfaces 26 may be user interface (UI) devices configured to operate as both input devices and output devices. For example, the UI devices may be configured to receive tactile, audio, or visual input from a user of computing device 12. In addition to receiving input from a user, the UI devices may be configured to provide output to a user using tactile, audio, or video stimuli. In one example, the UI devices may be configured to output content for display, e.g., a graphical user interface (GUI), in accordance with a user interface unit stored in Memory 30. In this example, the UI devices may include a presence-sensitive display that displays a GUI and receives input from a user using capacitive, inductive, and/or optical detection at or near the presence sensitive display. Other examples of the UI devices include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples of the UI devices include a speaker, a cathode ray tube (CRT) monitor, a liquid crystal display (LCD), organic light emitting diode (OLED), or any other type of device that can generate intelligible output to a user.

Biometric reader 28 may include one or more sensors to collect a biometric ID from a user of user computing device 12. Such a sensor may include a camera to collect a retinal scan or facial recognition image, a fingerprint scanner to collect a fingerprint, a microphone to collect a voice ID, or some similar sensor.

Computing device 12 may include additional components that, for clarity, are not shown in FIG. 2. For example, computing device 12 may include a battery to provide power to the components of computing device 12. Similarly, the components of computing device 12 shown in FIG. 2 may not be necessary in every example of computing device 12.

As illustrated in FIG. 2, user computing device 12 executes a plurality of applications such as social media applications (social media application 32 and social media application 34) and mobile wallet application 36 stored at memory 30. Some applications may be considered payment applications because these applications may have a feature that an application executing on device 12 may use to perform a secure transaction, such as to transfer funds to a receiver. For example, social media application 32 may be a social media application, such as Facebook or WhatsApp, that includes features that the user may use to send money to other users of social media application 32. In some examples, mobile wallet 36 may operate in conjunction with social media application 32 to perform the money transfer requested by the user via social media application 32. In other examples, mobile wallet 36 may operate as an embedded application within social media application 32. Social media application 34, on the other hand, may lack features for sending money to a receiver. Therefore, mobile wallet 36 and social media application 32 may be considered payment applications while social media application 34 is not a payment application.

Mobile wallet 36 may include features that the user may use to send money to a receiver. In some examples, mobile wallet 36 may be loaded with credit and debit cards, loyalty cards and gift cards, and other financial and non-financial instruments. The user may use mobile wallet 36 to tap and pay with device 12 at retail locations that have contactless card readers. For example, point of sale (POS) equipment using near field communication (NFC), Bluetooth®, or other technology. Some examples of mobile wallet 36 may give the user an option of connecting to a bank account belonging to the user. Mobile wallet 36 may include features that the user may use to send and receive money as person-to-person (P2P) payments, similar to social media application 32 described above.

Figure 3:
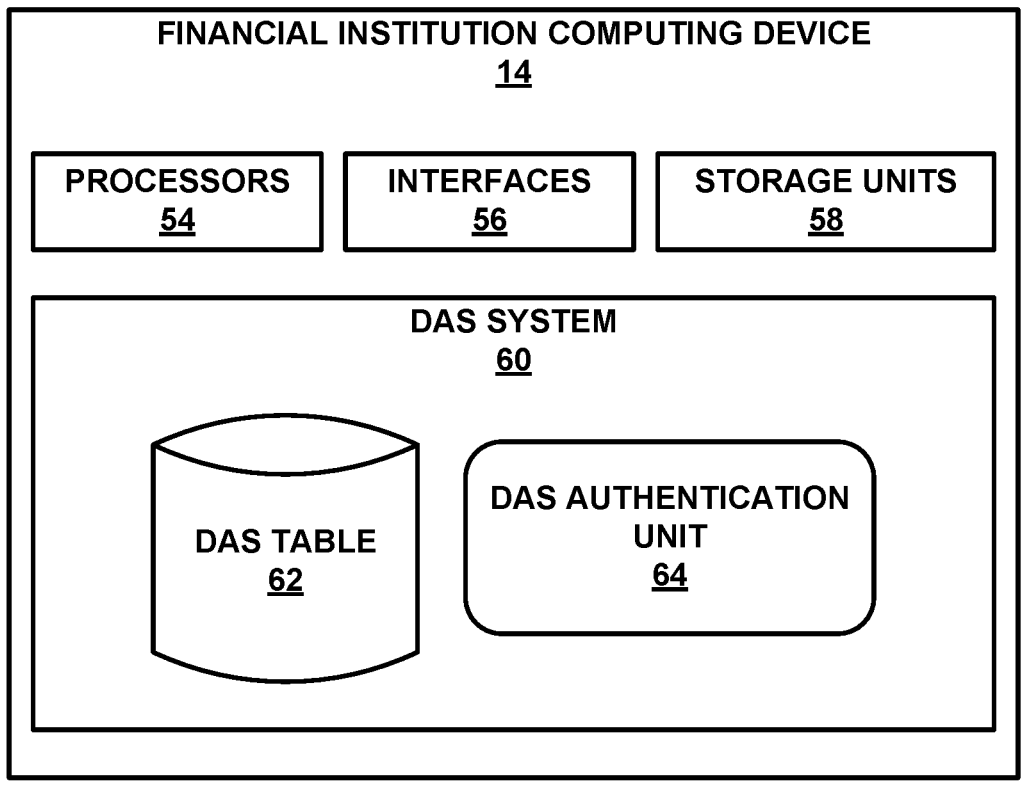
FIG. 3 is a block diagram illustrating an example of a secure system computing device including a device and social media (DAS) system configured to manage authentication with user computing devices, in accordance with the techniques of this disclosure.

FIG. 3 is a block diagram illustrating an example of financial institution computing device 14 including a device and social media (DAS) system 60 configured to manage secure authentication with user computing devices, in accordance with the techniques of this disclosure. Financial institution computing device 14 may operate substantially similar to secure system device 120 from FIG. 1. The architecture of financial institution computing device 14 illustrated in FIG. 3 is shown for exemplary purposes only and financial institution computing device 14 should not be limited to this architecture. In other examples, financial institution computing device 14 may be configured in a variety of ways. Additionally, as discussed above, financial institution computing device 14 corresponds to secure system device 120 depicted in FIG. 1. The description below is an example and need not be limited to a bank or other financial institution.

Financial institution computing device 14 is associated with a bank, credit union or other type of financial institution. Financial institution computing device 14 may be part of a centralized or distributed system of one or more computing devices, such as desktop computers, laptops, workstations, wireless devices, network-ready appliances, file servers, print servers, or other devices.

As shown in the example of FIG. 3, financial institution computing device 14 includes one or more processors 54, one or more interfaces 56, and one or more storage units 58. Financial institution computing device 14 also includes DAS system 60, which may be implemented as program instructions and/or data stored in storage units 58 and executable by processors 54 or implemented as one or more hardware units or devices of financial institution computing device 14. Storage units 58 of financial institution computing device 14 may also store an operating system executable by processors 54. The operating system stored in storage units 58 may control the operation of components of financial institution computing device 14. Although not shown in FIG. 3, the components, units or modules of financial institution computing device 14 are coupled (physically, communicatively, and/or operatively) using communication channels for inter-component communications. In some examples, the communication channels may include a system bus, a network connection, an inter-process communication data structure, or any other method for communicating data.

Processors 54, in one example, are configured to implement functionality and/or process instructions for execution within financial institution computing device 14. For example, processors 54 may be capable of processing instructions stored by storage units 58. Processors 54 may include, for example, microprocessors, digital signal processors (DSPs), application specific integrated circuits (ASICs), field-programmable gate array (FPGAs), or equivalent discrete or integrated logic circuitry, or a combination thereof.

Storage units 58 may be configured to store information within financial institution computing device 14 during operation. Storage units 58 may include a computer-readable storage medium or computer-readable storage device. In some examples, storage units 58 include one or more of a short-term memory or a long-term memory. Storage units 58 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 58 are used to store program instructions for execution by processors 54. Storage units 58 may be used by software or applications running on processors 54 of financial institution computing device 14 (e.g., DAS system 60) to temporarily store information during program execution.

Financial institution computing device 14 may utilize interfaces 56 to communicate with external devices via one or more networks, e.g., network 130 from FIG. 1. Interfaces 56 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, financial institution computing device 14 utilizes interfaces 56 to wirelessly communicate with an external device such as computing device 12 or financial institution computing device 14.

As illustrated in FIG. 3, financial institution computing device 14 includes a device and social media (DAS) system 60. In some examples, DAS system 60 may create a personal identifier, or ID pattern, for each combination of device ID, user biometrics ID, and social media account ID pre-registered by a user. In other examples, DAS system 60 may generate a personal identifier for each new combination of device ID, user biometrics ID, and social media account ID received from a user computing device, e.g., user computing device 12 or user device 110, once the user identification information is authenticated. In the example of FIG. 3, DAS system 60 includes DAS authentication unit 64 and DAS table 62.

DAS authentication unit 64 may manage the pre-registration process, described above in relation to FIG. 1, and generate one or more personal identifiers that each include a combination of device ID, social media ID, and biometric ID. DAS authentication unit 64 uses the personal identifier, or ID pattern or DAS ID, to perform the three-part authentication scheme described above.

In one example, the user may pre-register a payment application, such as a social media application 32 executed on device 12 from FIG. 2, with financial institution computing device 14. As part of the pre-registration process, social media application 32 may automatically collect the bio ID from the user. DAS authentication unit 64 may then create a DAS ID that includes the device ID of device 12, the social media ID for social media application 32, and the collected biometric ID. As described above, social media application 32 may send DAS authentication unit 64 an access token or similar credential and the social media ID as opposed to the actual social media login credentials that the user uses to sign in to social media application 32. The user may specify which accounts belonging to the user at the financial institution should be associated with the DAS ID. Once registered, the user may use the registered social media application on the registered user device to send a request to transfer a specified amount of money to a specified receiver using the DAS ID to authenticate the requested transfer.

In another example, the user may pre-register the user's identification information with either the financial institution or with a third party network, e.g., 3P network 130 from FIG. 1. Once registered, the user may use a registered social media application on a registered user device to send a request to transfer a specified amount of money to a specified receiver where the request include a device ID, a social media ID, and a biometric ID of the user. DAS authentication unit 64 may compare the three IDs received from the social media application against the DAS IDs stored in DAS table 62 to authenticate the user and the user's requested fund transfer. Although illustrated in FIG. 3 as being table, in other examples DAS table 62 may comprise another data structure, such as a database.

If the combination of the user ID, social media ID, and biometric ID does not match one of the existing DAS IDs within DAS table 62, then DAS authentication unit 64 may retrieve the user's pre-registered identification information from the database to authorize the user. If the three IDs map to the user's identification information, DAS authentication unit 64 authenticates the user and the user's requested fund transfer, and generates a DAS ID for the combination of the user ID, social media ID, and biometric ID.

Once DAS authentication unit 64 creates a DAS ID, DAS system 60 may store the DAS ID at DAS table 62. DAS table 62 may store several different DAS IDs for the user. For example, DAS table 62 may store a first DAS ID with the social media ID for social media application 32 and a second DAS ID for mobile wallet 36. The DAS IDs for social media application 32 and mobile wallet 36 may have the same device ID, e.g. for device 12, and the same bio ID for the user. However, each of the DAS IDs is different because the social media IDs are different.

Similarly, DAS table 62 may store a third DAS ID for the user in the example where the user uses a different device to access social media application 32. The third DAS ID stored at DAS table 62 may have the same social media ID for social media application 32 as well the same biometric ID for the user as the first DAS ID stored at DAS table 62. However, because the device ID is different than the first DAS ID, the third DAS ID will be different. In other words, the user may have a plurality of DAS IDs that in some examples may all be associated with the same account that belongs to the user. In this manner, if DAS system 60 disables a DAS ID because the user reports a device stolen or too many failed log-in attempts, the user may still perform a fund transfer by using a different, registered device or a different registered social media account. Additionally, other authorized users of device 12, such as user's family, may each have a DAS ID associated with the same device ID for device 12, but with the individual user's biometric ID and social media ID.

In some examples, DAS table 62 may include other information related to the user. This additional information may help make the authentication and pre-registration of a new device or social media account for the user more secure. In some examples, DAS table 62 may include links or pointers to other DAS IDs associated with the user, information about other accounts that belong to the user either at the financial institution or at other financial institutions, information about other payment applications that the user may use, social media graph information or other information. DAS authentication unit 64 may use this other information to confirm that the user is a valid user rather than a false user attempting to gain access to accounts belonging to the user. For example, DAS authentication unit 64 may prompt the user for other information stored in DAS table 62 and complete the requested transaction if the user is able to confirm this other information.

As described above, DAS table 62 and/or a database at the financial institution or a 3P network may store a social media graph for the user. A social media graph, which may also be called a social graph, may be a representation of the interconnection of relationships in an online social network. A social media graph may include information about other social media applications and payment applications used by the user, such as which other social media applications have access to accounts owned by the user. A social media graph for the user may include other users with which the user has interacted and how the user interacted with the other user. For example, the social media graph may include any receivers that the user has sent money in the past. The user may have more than one social media graph. For example, a social media graph may be proprietary to a particular social media application. The social media application may share some, but not all of the social media graph for the user with other applications. In other examples, social media graph may be in a first format for one application or system and in another format for a second application or system. Even if shared, the social media graph in the first format may not exactly match the social media graph in another format. However, even multiple social media graphs may help DAS authentication unit 64 to verify and authenticate a user. A social media graph for one user is unlikely to exactly match the social media graph of another user, even users from the same family.

Figure 4:
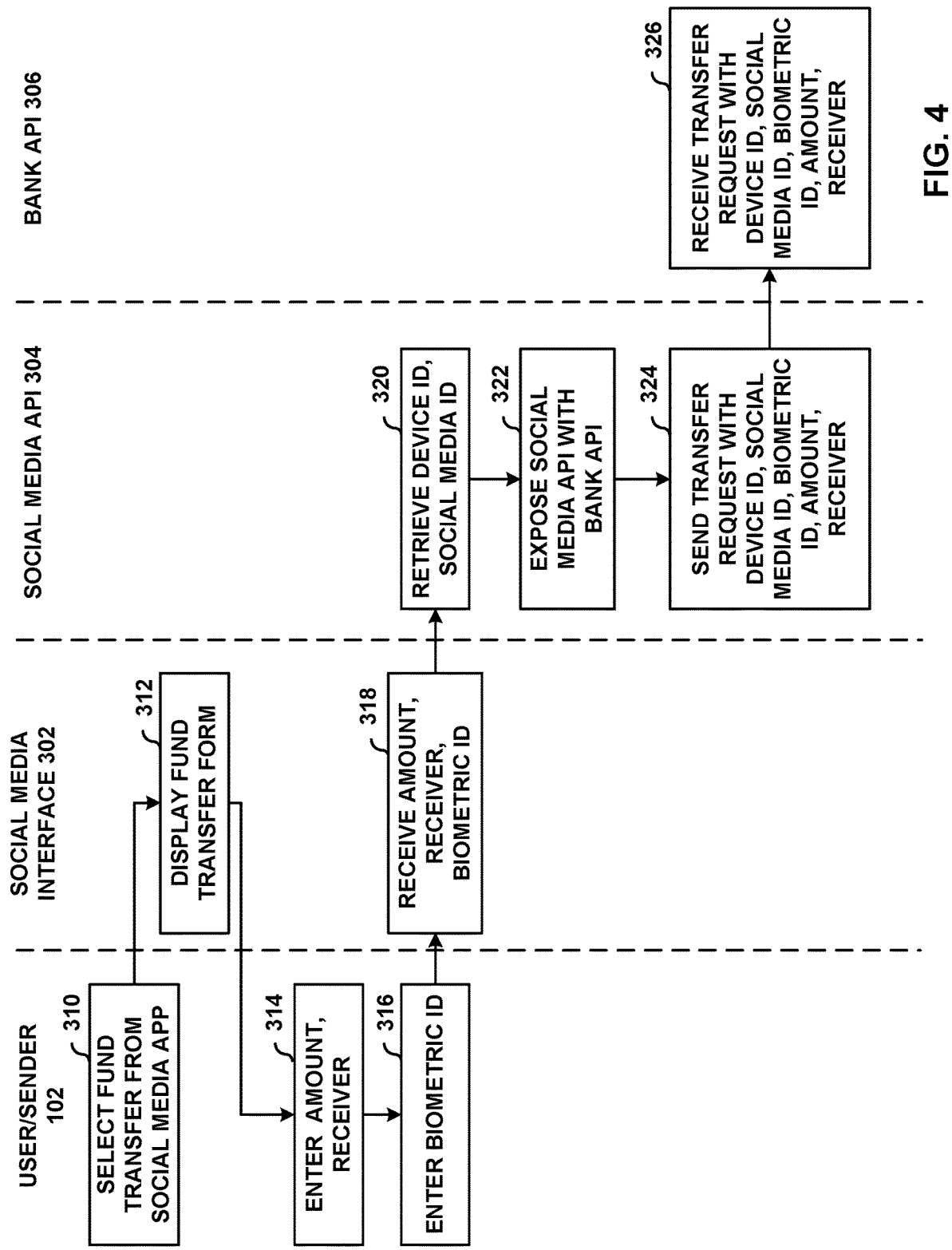
FIG. 4 is a flow chart illustrating an example operation of a user computing device initiating a fund transfer using a social media application according to one or more techniques of this disclosure.

FIG. 4 is a flow chart illustrating an example operation of a user computing device initiating a secure transaction using a social media application according to one or more techniques of this disclosure. The flowchart of FIG. 4 will be described in terms of the components of secure authentication system 100 depicted in FIG. 1, including user/sender 102 and social media application 112 executing on user device 110. The sequence of steps in the flowchart of FIG. 4 is but one example to illustrate the three-part authentication scheme of this disclosure. The steps may occur in a different order and there may be additional or fewer steps than shown in FIG. 4.

The flowchart of FIG. 4 depicts the interactions between user/sender 102 and a social media interface 302 of social media application 112. One or more processors in user computing device 110 may execute the programming instructions for the social media application 112, which may display social media interface 302. In the example of FIG. 4 the social media application 112 includes features for sending money to a receiver and is therefore a payment application. FIG. 4 also depicts the interactions between social media interface 302, social media application programming interface (API) 304 of social media application 112, and bank API 306 of secure system device 120. Secure system device 120, as depicted in FIG. 1 may execute programming instructions operable to execute bank API 306.

User/sender 102, corresponds to the user depicted in FIG. 1. User/sender 102 may be an individual or a representative of a business or government organization. User/sender 102 may be interacting with social media interface 302 executing on user computing device 110. User/sender 102 may decide to send money to a receiver. For example, user/sender 102 may meet for lunch with friends and forgot to bring money. User/sender 102 may wish to reimburse a friend who paid for the meal. User/sender 102 may select to perform a fund transfer from social media interface 302 within social media application 112 (310).

Social media interface 302 displays a fund transfer form (312). A fund transfer form may include fields to enter a receiver identifier, and an amount of money to be transferred to the receiver. The money may be transferred from an account held by the user at the bank such that the user may not need to specify the sender account. In other cases, the form may also include a field to enter the account from which to transfer the money. In some examples the fields may be text fields to enter an email address, phone number or other identifier for the receiver. In other examples, the form may include a drop down menu with choices for user/sender 102 to select.

User/sender 102 enters the amount, the receiver, and other information needed to complete the transaction (314). Social media interface 302 may prompt the user for a bio ID, such as a fingerprint impression (316). In some examples, bank API 306 may prompt social media API 304 to collect the bio ID, which may cause social media interface 302 to prompt user/sender 102 for a bio ID.

Social media interface 302 receives the indicated amount, receiver identifier, and bio ID, along with any other needed information (318), and passes the information to social media API 304. Social media API 304 retrieves the device ID associated with user device 110 and the social media ID associated with the user's social media account from social media application 112 (320). As described above, social media API 320 may retrieve an access token or similar access identifier for the social media application as the social media ID, rather than an actual username and PIN or password used to log into the user's social media account.

Social media API 304 may expose the social media API to bank API 306 (322) as social media API 304 prepares to pass the transaction information to bank API 306. In some examples this step of exposing social media API (322) may occur at a different point in the process. For example, social media API 304 may begin interacting with bank API 306 when user/sender 102 selects to perform a fund transfer (310) from a user's account at the bank.

Social media API 304 may be in communication with bank API 306 via a WiFi connection, wire connection, mobile broadband or other mobile cellular network. Interactions between social media API 304 and bank API 306 may include handshaking steps to validate and allow access from one API to the other. Handshaking will be explained in more detail in relation to FIG. 5 below.

Social media API 304 may pass the information needed to transfer funds from the account belonging to user/sender 102 to intended receiver. This may include the amount and receiver identification as well as the device ID, social media ID and biometric ID used in the three-part authentication scheme (324). When bank API 306 receives the transaction information (326), bank API 306 may provide the information to other components of secure system computing device 120, such as DAS system 122, for further processing. These steps will be described in more detail in relation to FIG. 5 below.

Figure 5:
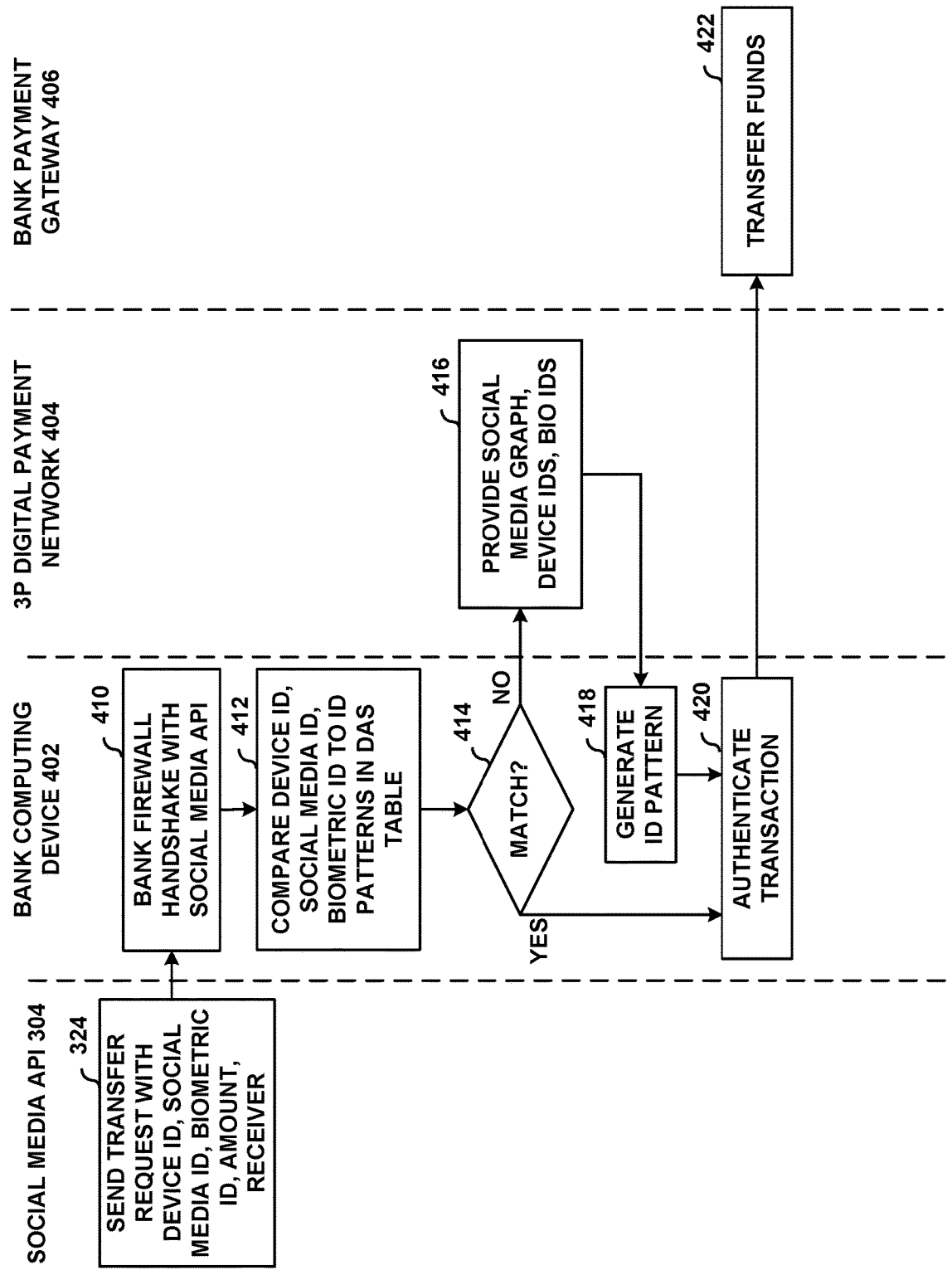
FIG. 5 is a flowchart illustrating an example operation of a bank computing device authenticating a user to perform a fund transfer according to one or more techniques of this disclosure.

FIG. 5 is a flowchart illustrating an example operation of a user computing device initiating a secure transaction using a social media application according to one or more techniques of this disclosure. As with FIG. 4 above, the steps depicted in FIG. 5 may also occur in a different order and there may be additional or fewer steps than shown. The steps of FIG. 5 will be described in relation to the components of secure authentication system 100 depicted in FIG. 1, including social media application 112 executing on user device 110, secure system computing device 120, referred to in FIG. 5 as a bank computing device 402, and 3P network 130, referred to in FIG. 5 as a 3P digital payment network 404.

The flowchart of FIG. 5 depicts interactions between social media API 304 of social media application 112 executed on user device 110, bank computing device 402, 3P digital payment network 404, and a bank payment gateway 406. Social media API 304 corresponds to social media API 304 described in relation to FIG. 4. Bank computing device 402 corresponds to secure system device 120 described in relation to FIG. 1. Bank computing device 402 may include one or more processors to execute steps depicted in FIG. 5. 3P digital payment network 404 corresponds to 3P network 130 described in relation to FIG. 1.

As described above for FIG. 4, social media API 304 may pass to bank computing device 402 the information needed to perform a fund transfer transaction (324). This may include the three-part authentication information of device ID, social media ID, and biometric ID, as well as the receiver identifier and the amount of money to be transferred.

Bank computing device 402 may include a firewall, which may interact with social media API 304 to perform handshake steps to allow the fund transfer transaction to take place (410). The handshake steps may include a variety of processes in which two computing devices initiate communications. In some examples, handshaking may begin when one device sends a message to another device indicating that it wants to establish a communications channel. The two computing devices may send several messages back and forth to agree on communication and security protocols as well as a level of access for the user.

A DAS system within bank computing device 402, e.g., DAS system 122, may compare the combination of the device ID, social media ID, and biometric ID to one or more ID patterns stored in a table at bank computing device 402 (412). In the example where the combination of the three IDs does not match any of the stored ID patterns (NO branch of 414), user/sender 102 may be a first-time sender using the social media fund transfer feature. In this case, DAS system 122 within bank computing device 402 may communicate with 3P digital payment network 404 to authenticate the user. For example, 3P digital payment network 404 may provide pre-registered identification information for the user, including one or more device IDs, one or more biometric IDs, and a social media graph to bank computing device 402 (416).

In this example, bank computing device 402 may request information about user/sender 102 from 3P digital payment network 404, when user/sender 102 is a first-time sender. 3P digital payment network 404 may include information on users that have pre-registered with 3P digital payment network 404. 3P digital payment network 404 may store user information at database 132, as described above. In some examples user/sender 102 may have registered to receive funds from another user through 3P digital payment network 404. In other examples, user/sender 102 may have used other social media or payment applications to send or receive funds through 3P digital payment network 404. In some manner, 3P digital payment network 404 may have information on user/sender 102 that may be helpful to bank computing device 402 to verify user/sender 102 is a valid sender. Storing social media graph information for user/sender 102 at 3P digital payment network 404 may have an advantage in that, even if a DAS ID to access a user's bank account via a first social media account is disabled, DAS system 60 may generate another DAS ID to access the user's bank account via a different social media account identified in the user's social media graph information.

Upon retrieving the identification information for the user from 3P digital payment network 404, bank computing device 402 may be able to confirm the validity of user/sender 102 by mapping the three IDs to the retrieved identification information from 3P digital payment network 404. If the three IDs provided by user/sender 102 map to the social media graph and other information from 3P digital payment network 404, bank computing device 402 may generate a personal ID pattern for the combination of the device ID, social media ID, and biometric ID (418). The personal ID pattern may be stored in a DAS table or other data structure at bank computing device 402 and used for future transactions. As described above, user/sender 102 may have more than one personal ID pattern stored in the DAS table. In some examples, one or more personal ID patterns stored in the DAS table may be linked together, such as having at least a common device ID. In other examples, separate ID patterns for user/sender 102 may also be linked together by a common social media ID or biometric ID.

In the example where the combination of the three IDs does match one of the stored ID patterns (YES branch of 414) or once the personal ID pattern is generated (418), bank computing device 402 may authenticate the user and the user's requested transaction (420). In other words, bank computing device 402, may receive a notification indicating the requested transaction is authenticated. Bank payment gateway 406 may then use the sender and receiver information to perform the requested fund transfer (422). For any future transactions from user/sender 102, DAS system 122 of bank computing device 402 may authenticate the user against the personal ID pattern created using the combination of the device ID, biometric ID, and social media ID stored in the DAS table to authenticate the transaction (420). In some examples, authenticating a transaction may also be called authorizing a transaction. Bank payment gateway 406 may then use the sender and receiver information to transfer money (422) for the transaction.

Sender and receiver information may include details about the sender's account and the receiver's account, such as bank routing number, account number, or other information for bank payment gateway 406 to complete the transfer. In some examples, bank computing device 402 may retrieve the account details (e.g. routing number) from 3P digital payment network 404. In the example of a P2P fund transfer, sender/receiver 102 may enter a receiver identifier, such as a phone number or email address, and 3P digital payment network 404 may use the receiver identifier to retrieve account details for the receiver, which bank payment gateway 406 may use to complete the transaction.

Although the techniques are primarily described herein as being used to authenticate a user to perform a fund transfer via social media channels, the techniques described in this disclosure may be used to authenticate a user for a variety of other purposes, such as accessing restricted or private information, signing a confidential document, or other purposes where authenticating a user prior to allowing access to a secure system may be desirable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method for authenticating a user to perform a transaction via a social media channel, the method comprising:
   maintaining, by a computing system of a financial institution at which the user holds a financial account, information about one or more device identifiers associated with the user, one or more biometric identifiers associated with the user, and a social media identifier associated with the user, wherein the maintaining comprises receiving the identifiers from a user computing device over a network during a user registration process, wherein the social media identifier comprises an access token associated with a social media application executing on the user computing device, and wherein the social media application is configured to access the financial account;
   storing, by the computing system in a first database, one or more personal ID patterns comprising a combination of the identifiers associated with the user received during the user registration process;
   receiving, by the computing system and over the network from the social media application executing on the user computing device, a request to perform the transaction, wherein the request includes a device identifier associated with the user computing device, biometric information captured by the user computing device, and a social media identifier associated with the social media application;
   determining, by the computing system, that the social media identifier associated with the social media application does not match the social media identifier associated with the user, wherein the determining comprises generating, by the computing system, a combination of the received identifiers and comparing the combination of received identifiers to the one or more of the stored personal ID patterns;
   identifying, by the computing system, an alternative social media identifier used by the user for a different social media account by accessing a social media graph associated with the user, wherein the identifying comprises accessing the social media graph over the network from a second database that is distinct from the first database, wherein the social media graph comprises one or more social media graphs that identify other social media accounts held by the user, and wherein the alternative social media identifier is different than the social media identifier associated with the user received during the user registration process;

authenticating, by the computing system, the user based on a mapping of the device identifier to the one or more stored device identifiers, the biometric information to the one or more stored biometric identifiers, and the social media identifier associated with the social media application to the alternative social media identifier;

generating, by the computing system, a new personal ID pattern based on the combination of the device identifier, the biometric identifier, and the alternative social media identifier; and storing, by the computing system, the new personal ID pattern to enable authenticating the user in future transactions.

2. The method of claim 1, further comprising:
responsive to authenticating the user, enabling the financial transaction to be performed.

3. The method of claim 1, wherein authenticating the user includes:
comparing the new personal ID pattern based on the combination of the device identifier, the biometric identifier, and the alternative social media identifier to a stored combination of identifiers, wherein the stored combination is derived from the one or more stored device identifiers associated with the user and from the one or more stored biometric identifiers associated with the user.

4. The method of claim 1, wherein maintaining the information includes:
maintaining a database of a plurality of combinations, each derived from the one or more stored device identifiers and the one or more stored biometric identifiers.

5. The method of claim 1, wherein maintaining the information further includes:
receiving information about the social media graph associated with the user.

6. The method of claim 1, wherein receiving the request to perform the transaction includes:
enabling the social media application executing on the user computing device to receive the request to perform the transaction.

7. The method of claim 1, wherein receiving the request to perform the transaction includes:
enabling the social media application executing on the user computing device to prompt the user for the biometric information captured by the user computing device.

8. The method of claim 1, wherein receiving the request to perform the transaction includes:
enabling the social media application executing on the user computing device to access the biometric information captured by the user computing device.

9. A computing system for authenticating a user to perform a transaction via a social media channel, the computing system comprising a storage system and processing circuitry, wherein the processing circuitry has access to the storage system and is configured to:
maintain information about one or more device identifiers associated with the user, one or more biometric identifiers associated with the user, and a social media identifier associated with the user, wherein the maintaining comprises receiving the identifiers from a user computing device over a network during a user registration process, wherein the social media identifier comprises an access token associated with a social media application executing on the user computing device, and wherein the social media application is configured to access a financial account held by the user at a financial institution;

store, in a first database, one or more personal ID patterns comprising a combination of the identifiers associated with the user received during the user registration process;

receive, over the network and from a social media application executing on the user computing device, a request to perform the transaction, wherein the request includes a device identifier associated with the user computing device, biometric information captured by the user computing device, and a social media identifier associated with the social media application;

determine that the social media identifier associated with the social media application does not match the social media identifier associated with the user, wherein to determine, the processing circuitry generates a combination of the received identifiers and comparing the combination of received identifiers to the one or more of the stored personal ID patterns;

identify an alternative social media identifier used by the user for a different social media account by accessing a social media graph associated with the user over the network from a second database that is distinct from the first database, wherein the social media graph comprises one or more social media graphs that identify other social media accounts held by the user, and wherein the alternative social media identifier is different than the social media identifier associated with the user received during the user registration process;

authenticate the user based on a mapping of the device identifier to the one or more stored device identifiers, the biometric information to the one or more stored biometric identifiers, and the social media identifier associated with the social media application to the alternative social media identifier;

generate a new personal ID pattern based on the combination of the device identifier, the biometric identifier, and the alternative social media identifier; and store the new personal ID pattern to enable authenticating the user in future transactions.

10. The computing system of claim 9, wherein the processing circuitry is further configured to:
responsive to authenticating the user, enable the transaction to be performed.

11. The computing system of claim 9, wherein to authenticate the user, the processing circuitry is further configured to:
compare the new personal ID pattern based on the combination of the device identifier, the biometric identifier, and the alternative social media identifier to a stored combination of identifiers, wherein the stored combination is derived from the one or more stored device identifiers associated with the user and from the one or more stored biometric identifiers associated with the user.

12. The computing system of claim 9, wherein to maintain the information, the processing circuitry is further configured to:
maintain a database of a plurality of combinations, each derived from the one or more stored device identifiers and the one or more stored biometric identifiers.

13. The computing system of claim 9, wherein to maintain the information the processing circuitry is further configured to:
receive information about the social media graph associated with the user.

14. A non-transitory computer-readable storage medium comprising instructions that, when executed, configure processing circuitry of a computing system for authenticating a user to perform a transaction via a social medial channel to:
- maintain information about one or more device identifiers associated with the user, one or more biometric identifiers associated with the user, and a social media identifier associated with the user, wherein the maintaining comprises receiving the identifiers from a user computing device over a network during a user registration process, wherein the social media identifier comprises an access token associated with a social media application executing on the user computing device, and wherein the social media application is configured to access a financial account held by the user at a financial institution;
- store, in a first database, one or more personal ID patterns comprising a combination of the identifiers associated with the user received during the user registration process;
- receive, over the network and from a social media application executing on the user computing device, a request to perform the transaction, wherein the request includes a device identifier associated with the user computing device, biometric information captured by the user computing device, and a social media identifier associated with the social media application;
- determine that the social media identifier associated with the social media application does not match the social media identifier associated with the user, wherein to determine, the processing circuitry generates a combination of the received identifiers and comparing the combination of received identifiers to the one or more of the stored personal ID patterns;
- identify an alternative social media identifier used by the user for a different social media account by accessing a social media graph associated with the user over the network from a second database that is distinct from the first database, wherein the social media graph comprises one or more social media graphs that identify other social media accounts held by the user, and wherein the alternative social media identifier is different than the social media identifier associated with the user received during the user registration process;
- authenticate the user based on a mapping of the device identifier to the one or more stored device identifiers, the biometric information to the one or more stored biometric identifiers, and the social media identifier associated with the social media application to the alternative social media identifier;
- generate a new personal ID pattern based on the combination of the device identifier, the biometric identifier, and the alternative social media identifier; and
- store the new personal ID pattern to enable authenticating the user in future transactions.

\* \* \* \* \*